(12) United States Patent
Koga et al.

(10) Patent No.: US 7,552,162 B2
(45) Date of Patent: Jun. 23, 2009

(54) RECEIVER AND COMMUNICATION METHOD FOR DIGITAL MULTI-CARRIER COMMUNICATION

(75) Inventors: Hisao Koga, Chikushi-gun (JP); Nobutaka Kodama, Fukuoka (JP)

(73) Assignee: Panasonic Corporation, Osaka (JP)

( * ) Notice: Subject to any disclaimer, the term of this patent is extended or adjusted under 35 U.S.C. 154(b) by 595 days.

(21) Appl. No.: 11/302,496

(22) Filed: Dec. 14, 2005

(65) Prior Publication Data
US 2006/0133528 A1 Jun. 22, 2006

(30) Foreign Application Priority Data
Dec. 16, 2004 (JP) ............... P. 2004-364413

(51) Int. Cl.
*G06F 17/14* (2006.01)
(52) U.S. Cl. .................... 708/404; 375/260
(58) Field of Classification Search ............ 375/260; 708/404
See application file for complete search history.

(56) References Cited

U.S. PATENT DOCUMENTS

| | | | |
|---|---|---|---|
| 5,497,398 A | 3/1996 | Tzannes et al. |
| 5,631,610 A | 5/1997 | Sandberg et al. |
| 5,636,246 A | 6/1997 | Tzannes et al. |
| 5,995,539 A | 11/1999 | Miller |
| 6,473,409 B1 | 10/2002 | Malvar |
| 6,487,574 B1 | 11/2002 | Malvar |
| 6,496,795 B1 | 12/2002 | Malvar |
| 6,532,256 B2 | 3/2003 | Miller |
| 6,549,520 B1 | 4/2003 | Gross et al. |
| 6,944,232 B2 | 9/2005 | Koga et al. |
| 6,952,441 B2 | 10/2005 | Peeters |
| 2001/0033612 A1 | 10/2001 | Peeters |
| 2003/0057529 A1 | 3/2003 | Ikenaga |
| 2003/0156014 A1 | 8/2003 | Kodama et al. |
| 2004/0015530 A1* | 1/2004 | Kang .................... 708/404 |
| 2005/0008086 A1 | 1/2005 | Koga et al. |
| 2005/0031048 A1 | 2/2005 | Koga et al. |
| 2005/0037722 A1 | 2/2005 | Koga et al. |

FOREIGN PATENT DOCUMENTS

| | | |
|---|---|---|
| EP | 1039715 | 9/2000 |
| JP | 11252031 | 9/1999 |

(Continued)

OTHER PUBLICATIONS

P. P. Vaidynathan, "Multirate Systems and Filter Banks", 1992 Prentice-Hall, Chapter 8, Cosine Modulated Filter Banks, p. 353-390.

(Continued)

*Primary Examiner*—David C Payne
*Assistant Examiner*—Tanmay K Shah
(74) *Attorney, Agent, or Firm*—Dickinson Wright, PLLC

(57) ABSTRACT

A receiving apparatus and receiving method employ a digital multi-carrier transmission technique utilizing a real coefficient wavelet filter bank in digital demodulation. The receiving apparatus may include a memory configured to store received waveform data corresponding to 2K symbols or more and a wavelet transformer configured to perform a wavelet transform based on the received waveform data stored in the memory, where K is an overlapping coefficient of a wavelet filter bank utilizing extended lapped transform (ELT).

9 Claims, 14 Drawing Sheets

FOREIGN PATENT DOCUMENTS

| | | |
|---|---|---|
| JP | 11275165 | 10/1999 |
| JP | 2000165304 | 6/2000 |
| JP | 2000278237 | 10/2000 |
| JP | 2001298439 | 10/2001 |
| JP | 2003218831 | 7/2003 |

OTHER PUBLICATIONS

J. Alhava, et al., "Adaptive Sine-Modulated/Cosine-Modulated Filter Bank Equalizer for Transmultiplexers," European Conference on Circuit Theory and Design, Espoo, Finland, Aug. 28-31, 2001, pp. 337-340.

A. Viholainen, et al., "Implementation of Parallel Cosine and Sine Modulated Filter Banks for Equalized Transmultiplexer Systems," Telecommmunications Laboratory, Tampere University of Technology, Tampere, Finland, IEEE, 2001, pp. 3625-2628.

A. Viholainen, et al., "Complex Modulated Critically Sampled Filter Banks Based on Cosine and Sine Modulation," Institute of Communications Engineering, Tampere University of Technology, Tampere, Finland, IEEE, 2002, pp. 833-836.

J. Alhava, et al., "Exponentially-Modulated Filter Bank-Based Transmultiplexer," Tampere University of Technology, Institute of Communications Engineering, Tampere, Finland, IEEE, 2003, pp. 233-236.

J. Alhava, et al., "Efficient Implementation of Complex Exponentially-Modulated Filter Banks," Tampere University of Technology, Institute of Communications Engineering, Tampere, Finland, 2003, pp. 157-160.

Y. Yang, et al., "DSP Implementation of Low-Complexity Equalizer for Multicarrier Systems," Institute of Communications Engineering, Tampere University of Technology, IEEE, 2003, pp. 271-274.

A. Viholainen, et al., "Alternative Subband Signal Structures for Complex Modulated Filter Banks with Perfect Reconstruction," Institute of Communications Engineering, Tampere University of Technology, Tampere, Finland, IEEE, 2004, pp. 525-528.

T. Ihalainen, et al., "Efficient Per-Carrier Channel Equalizer for Filter Bank Based Multicarrer Systems," Institute of Communications Engineering, Tampere University of Technology, Tampere, Finland, IEEE, 2005, pp. 3175-3178.

M. Ohm: "Extended Lapped Transforms for Digital Multicarrier Modulation", Globecom '01, 2001 IEEE Global Telecommunications Conference, San Antonio, TX, Nov. 25-29, 2001, IEEE Global Telecommunications Conference, New York, NY, vol. 1 of 6, Nov. 25, 2001, pp. 217-221, XP001090248.

Malvar H: "Signal Processing with Lapped Transforms", Artech House, Inc., Norwood, MA, US, 1992, pp. 175-212.

Japanese Office Action dated Nov. 22, 2006 with English translation.

M. C. Sun, et al., "Power-Line Communications using DWMT Modulation," 2002 IEEE International Symposium on Circuits and Systems, vol. 4, XP002271367, pp. 493-496, May. 26-29, 2002.

* cited by examiner

RECEIVER AND COMMUNICATION METHOD FOR DIGITAL MULTI-CARRIER COMMUNICATION

BACKGROUND OF THE INVENTION

1. Field of the Invention

The present invention relates to a receiver and communication method employing a multi-carrier transmission method utilizing real coefficient wavelet filter banks, that is, the so-called digital wavelet multi-carrier (DWMC) transmission method.

2. Description of Related Art

A multi-carrier transmission method utilizing orthogonal frequency division multiplexing (OFDM) offers wideband communication in the "Digital Terrestrial Television Broadcasting" service in Japan or in a wireless local area network (LAN) system utilizing a standard such as IEEE 802.11a/g. The fast Fourier transform (FFT), which is a kind of a complex filter bank, is usually utilized as a digital modulation/demodulation method in order to provide the multi-carrier transmission.

Instead of the FFT, the present inventors have introduced a new digital modulation/demodulation method utilizing the DWMC transmission method, for example, as shown in U.S. Patent Publication US2003/156014 A1. Synthesizing a plurality of digital modulated waveforms in real coefficient wavelet filter banks produces a transmission signal in the DWMC transmission method. Pulse amplitude modulation (PAM) is used as a method for modulating each carrier.

A DWMC data transmission method will be described with reference to FIGS. 9 to 13.

As shown in FIG. 9, each subcarrier has an impulse response, and impulse responses of each subcarrier are transmitted in an overlapping relationship with each other among a plurality of subcarriers. As shown in FIG. 10, each transmission symbol is formed by a time waveform that is a combination of impulse responses of a plurality of subcarriers. FIG. 11 shows an example of amplitude spectrum. A transmission frame is formed by several tens to several hundreds of transmission symbols shown in FIG. 10 according to the DWMC transmission method. A configuration example of a DWMC transmission frame is shown in FIG. 12. The DWMC transmission frame includes an information data symbol (SB1) for information data transmission and a preamble symbol (SB2) for symbol synchronization, equalization or the like.

In FIG. 13, a communication apparatus introduced by the inventors comprises a receiver 199 and a transmitter 299. The receiver 199 comprises an A/D (analog-to-digital) converter 110 for converting analog data to digital data, a wavelet transformer 120 for performing discrete wavelet transform (DWT), a parallel-to-serial (P/S) converter 130 for converting parallel data to serial data and a decision unit 140 for deciding a kind of receiving signal. The transmitter 299 comprises a symbol mapper 210 for converting bit data to symbol data and performing symbol mapping, a serial to parallel (S/P) converter 220 for converting serial data to parallel data, an inverse wavelet transformer 230 for performing inverse discrete wavelet transform (IDWT) and a digital-to-analog (D/A) converter 240.

An operation of the communication apparatus will now be described. First, in the transmitter 299 the symbol mapper 210 converts bit data of transmit data to symbol data, then performs symbol mapping in accordance with the symbol data, and outputs serial data. Here, PAM is used for symbol mapping. The S/P converter 220 converts the serial data to parallel data and provides a real number (Di, i=1 to M, where M is an integer) to symbol data per every subcarrier. The inverse wavelet transformer 230 performs the IDWT of the Di onto a time axis. Thereby, a sampling value of waveform on a time axis is generated, and a series of sampling values, which represent transmission symbol, are generated. The D/A converter 240 converts the series of sampling values to an analog base-band signal waveform. Then, the transmitter 299 transmits the analog base-band signal waveform to the receiver 199. In addition, the number of the sampling values on the time axis, which are generated by the IDWT, is usually the n-th power of 2 (where n is a positive integer).

Next, in the receiver 199, the A/D converter 110 samples the analog base-band signal waveform with the same sampling rate as that in the transmitter 299, and obtains a series of sampling values. The wavelet transformer 120 performs wavelet transform of the series of sampling values on a frequency axis. The P/S converter 130 converts parallel data to serial data. The decision unit 140 calculates an amplitude value of each subcarrier, and decides what kind of signal the received signal is.

A conventional configuration of the wavelet converter 120 is shown in FIG. 14. As the wavelet converter 120, the use of cosine modulated filter banks (CMFB) utilizing extended lapped transform (ELT) is well-known in the art, as shown in "Signal Processing with Lapped Transforms," H. S. Malvar, Artech House, 1992, and "Multirate Systems and Filter Banks," P. P. Vaidyanathan, Prentice-Hall, 1992.

As shown in FIG. 14, the wavelet converter 120 comprises a waveform register 121, butterfly operation units 122a and 122b (which may be, for example, Cooley-Tuke type FFT algorithm processing units), registers 123a, 123b and 123c, and a discrete cosine transformer (DCT) 124. In addition, FIG. 14 shows an example of the wavelet transformer 120 that the number of filter banks is equal to 4 and an overlapping factor of ELT is equal to 2. Furthermore, a filter length(L) of the wavelet transformer 120 is equal to NM, where N is equal to 2K.

The waveform register 121 stores a received waveform for one symbol in accordance with the series of sampling values. The butterfly operation units 122a and 122b perform a butterfly operation for M inputted signals based on parameters of the butterfly operation. Each of the registers 123a, 123b and 123c delays an inputted signal by one symbol, and outputs the one symbol-delayed signal. The DCT 124 provides an output signal representing a discrete cosine transformed input signal as parallel data.

Next, an operation of the wavelet transformer 120 will be described. A detailed description regarding a general operation of a wavelet transformer utilizing butterflies is provided in the H. S. Malvar reference cited above. Now, the waveform register 121 stores a received waveform of Nth symbol, and outputs the Nth waveform. The butterfly operation unit 122a receives the Nth waveform, performs a butterfly operation on the Nth waveform, and outputs a result of the operation for a received signal of the Nth symbol.

The register 123a delays the output signal from the butterfly operation unit 122a by one symbol, and outputs the one-symbol-delayed signal. Therefore, the output from the register 123a changes from operation result of nth symbol to operation result of (N−1)th symbol. The register 123b delays the output signal from the register 123a by one symbol, and outputs the one-symbol-delayed signal. Therefore, the output from the register 123b changes from operation result of (N−1) th symbol to operation result of (N−2)th symbol.

The butterfly operation unit 122b performs a butterfly operation on the output from the register 123b (operation result of (N–2)th symbol) and the output from the butterfly operation unit 122a (operation result of Nth symbol), and outputs operation results of both the Nth symbol and the (N–2)th symbol.

The register 123c delays outputted signals for both the Nth symbol and the (N–2)th symbol from the unit 122b by one symbol, and outputs the one-symbol-delayed signals. Therefore, the output from the register 123c changes from operation result of both nth and (N–2)th symbols to operation result of both (N–1)th and (N–3)th symbols.

The DCT 124 performs an orthogonal transform between the operation result of both the nth and the (N–2)th symbols, and also performs an orthogonal transform between the operation result of both the (N–1)th and the (N–3)th symbols.

The wavelet transformer 120 shown in FIG. 14 operates to demodulate by operating to receive by one symbol and then to delay the received waveform of the symbol by at most three symbols (=N–1).

Therefore, if symbol timing deviation occurs, the deviation will be detected four symbols after the deviation occurs. Furthermore, in order to demodulate data at the timing after the deviation occurred, the wavelet transformer 120 needs to restart to get data at the right timing. Getting data takes additional time corresponding to four symbols. The conventional wavelet transformer 120 needs to perform its operation corresponding to eight symbols in order to respond to the timing deviation. Therefore, it is difficult for the conventional wavelet transformer 120 to quickly respond to a symbol timing deviation.

SUMMARY

Some embodiment examples described herein address the above-mentioned problem.

According to an embodiment example, a receiving apparatus employs a digital multi-carrier transmission method utilizing a real coefficient wavelet filter bank in digital demodulation. The receiving apparatus comprises a memory configured to store received waveform corresponding to 2K symbols or more and a wavelet transformer configured to perform wavelet transform based on the received waveform stored in the memory. K is an overlapping coefficient of a wavelet filter bank utilizing extended lapped transform.

BRIEF DESCRIPTION OF THE DRAWINGS

FIG. 5(a) is a diagram showing an operation method among a butterfly processor;

FIG. 5(b) is a schematic block diagram showing a configuration of the butterfly shown in FIG. 5(a);

FIG. 5(c) is a schematic block diagram showing a configuration of the butterflies 12a, 12b and 13a;

FIG. 5(d) is a schematic block diagram showing a configuration of the butterflies 12c, 12d and 13b;

DETAILED DESCRIPTION OF EMBODIMENT EXAMPLES

Embodiment examples will be described below with reference to FIGS. 1 and 8.

Figure 1:
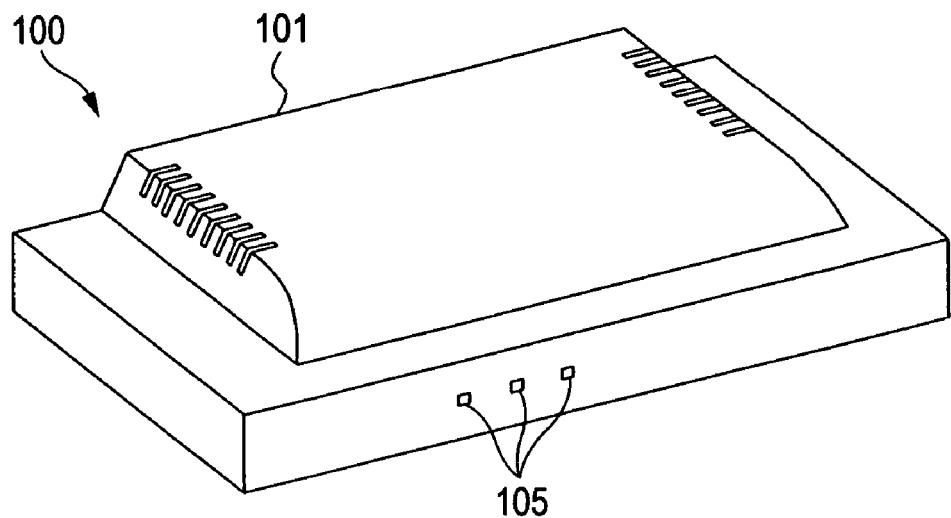
FIG. 1 is a front external perspective view of a communication apparatus.
Figure 2:
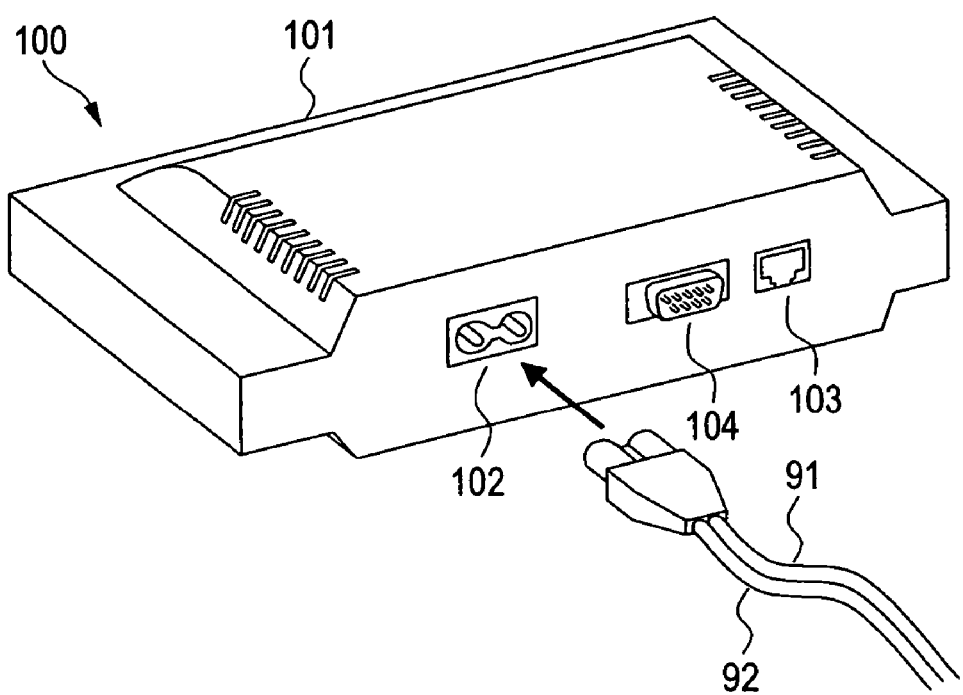
FIG. 2 is a rear external perspective view of a communication apparatus.

A communication apparatus 100 is a modem as shown in FIGS. 1 and 2. The communication apparatus 100 comprises a casing 101. A display unit 105 is located in a front panel of the casing 101. Display unit may be provided by a light emitting diode (LED) indicator, a liquid crystal display (LCD), an LED display or the like. As shown in FIG. 2, a power connector 102, a LAN connector 103 such as RJ45 and a D-sub connector 104 are located in a rear panel of the casing 101. As shown in FIG. 2, a pair of lines 91 and 92 such as parallel cable are connected to the power connector 102. A LAN cable, which is not shown in FIGS. 1 and 2, is connected to the LAN connector 103. A D-sub cable, which is not shown in FIGS. 1 and 2, is connected to the D-sub connector 104. In addition, electric equipment and appliances with an internal modem, such as a television, a refrigerator, a microwave or the like, may be used as the communication apparatus 100.

Figure 3:
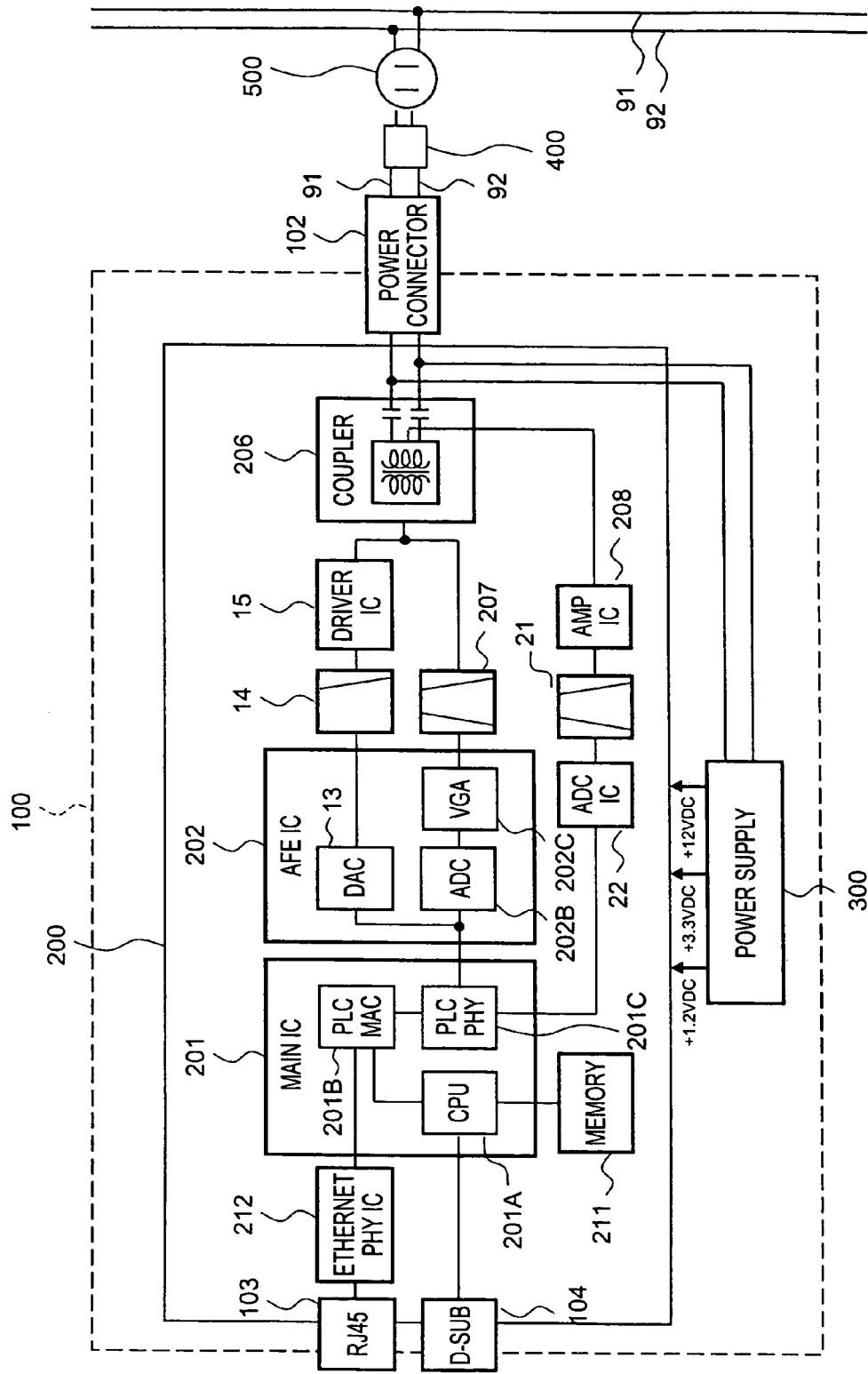
FIG. 3 is a block diagram showing an example of hardware configuration of a communication apparatus.

As shown in FIG. 3, the communication apparatus further comprises electronic circuitry 200 and a switching power source 300. The switching power source 300 supplies several kinds of voltages, such as +1.2 (V), +3.3 (V) and +12 (V), to the electronic circuitry 200. The electronic circuitry 200 comprises a main integrated circuit (IC) 201, analog front end IC (AFE/IC) 202, a low pass filter (LPF) 14, a driver IC 15, a coupler 206, a band pass filter (BPF) 207, an amplifier IC (AMP/IC) 208, another BPF 21, an A/D converter IC (ADC/IC) 22, a memory 211, and an ethernet physical layer IC (E-PHY/IC) 212. The power connector 102 is connected to the pair of lines 91 and 92 via a plug 400 and an outlet 500. As shown in FIG. 3, it is possible to locate the power connector 102 to a different panel from the rear panel as shown in FIG. 2.

Figure 15:
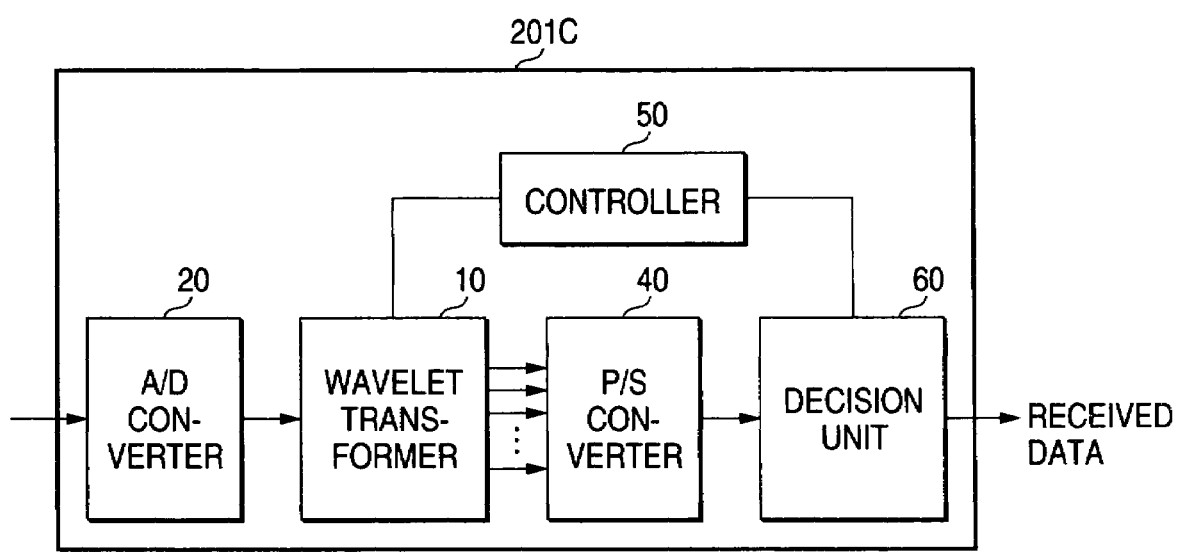
FIG. 15 is a block diagram showing an example of configuration of a part of PLC/PHY block.

The main IC comprises a central processing unit (CPU) 201A, a power line communication/media access control layer (PLC/MAC) block 201B, and PLC/physical layer (PLC/PHY) block 201C. The CPU 201A has a 32-bit reduced instruction set computer (RISC) processor. The PLC/MAC block 201B manages a MAC layer of a transmit signal. The PLC/PHY block 201C manages a physical layer of a transmit signal. The AFE/IC 202 comprises a DAC 13, an ADC 202B and a variable gain amplifier (VGA) 202C. The coupler 206 comprises a coil transformer 206A and coupling condensers 16a and 16b. If the communication apparatus works as a receiver, the PLC/PHY block 201C comprises an A/D converter 20, a wavelet transformer 10, a P/S converter 40, a controller 50 and a decision unit 60 as shown in FIG. 15. Controller 50 controls the wavelet transformer 10 and the decision unit 60.

Figure 4:
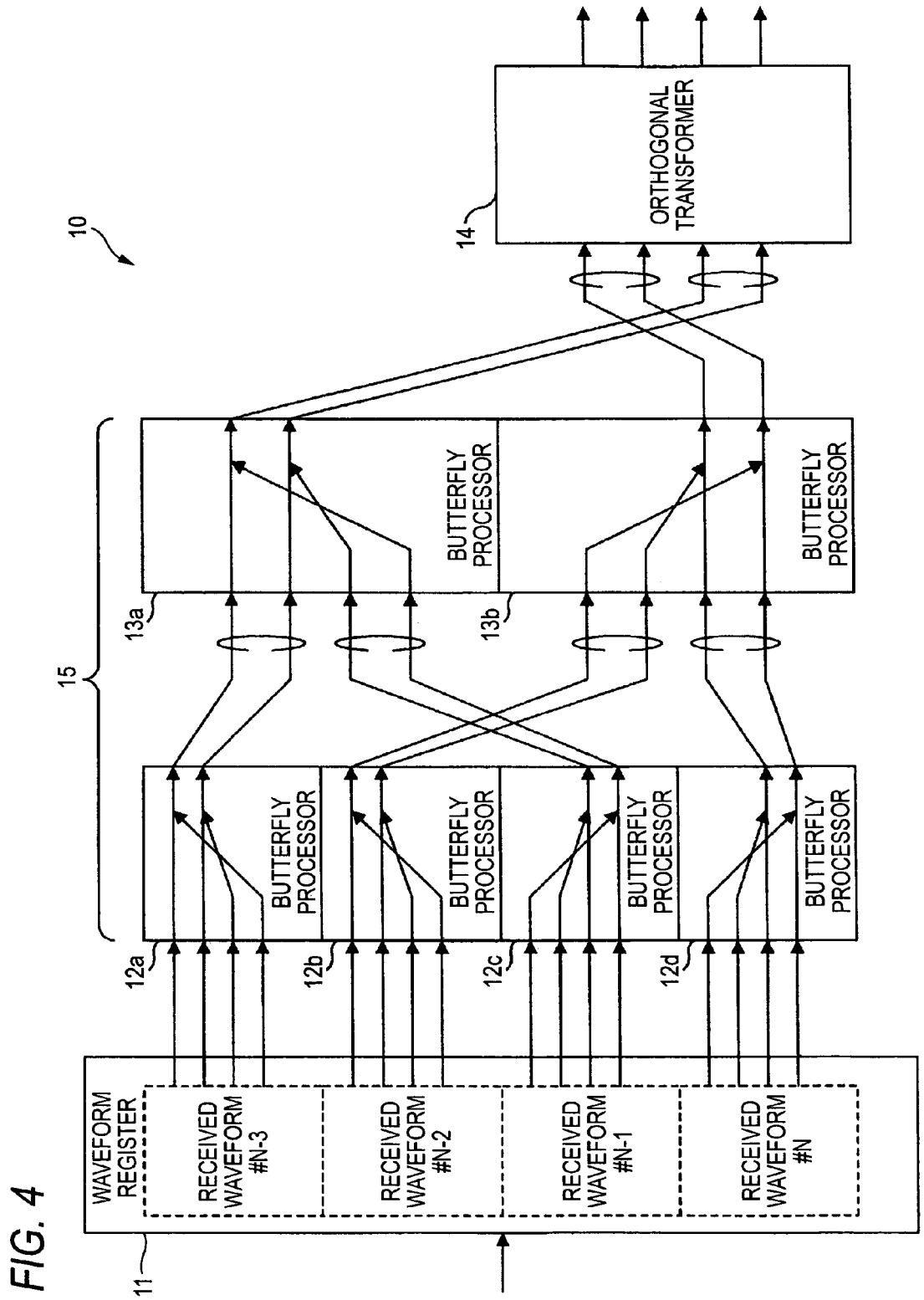
FIG. 4 is a block diagram showing an example of configuration of a wavelet transformer.

As shown in FIG. 4, a wavelet transformer 10 comprises a waveform register 11, butterfly operation unit 15 which comprises butterflies 12a, 12b, 12c, 12d, 13a and 13b, and an orthogonal transformer 14. The wavelet transformer 10 shown in FIG. 4 comprises real coefficient wavelet filter banks utilizing ELT. In addition, in this embodiment example shown in FIG. 4, the number of filter banks is equal to 4 and an overlapping factor of ELT is equal to 2. Furthermore, N is equal to 2K in this embodiment example. The overlapping factor is the number of stages in the butterfly operation unit. Furthermore, the waveform register 11 and the orthogonal transformer 14 may be located outside the wavelet transformer 10.

The waveform register 11 is operable to store received waveform data for N (=2K) symbols or more. Therefore, in this embodiment example, the waveform register 11 stores received waveform data for four symbols because K is equal to 2. The waveform register 11 is an example of a memory to store received waveform data, and many kinds of memories may be used instead of the waveform register 11. Almost all kinds of memories may be used instead of the waveform register 11.

The butterflies 12a, 12b, 12c, 12d, 13a and 13b perform a butterfly operation to signals inputted thereto. The butterfly operation unit 15 has K stages of a plurality of butterflies. If a first stage is a stage closest to the orthogonal transformer 14 (that is, output side) and a kth stage is a stage closest to the wave form register 11 (that is, input side), the first stage comprises two butterfly processors and the Kth stage comprises 2K butterfly processors. Therefore, 2K butterfly processors in the Kth stage are operable to treat received signals for 2K symbols at the same time since each butterfly processor corresponds to one symbol. In this embodiment example, as shown in FIG. 4, since K is equal to 2, the butterfly unit 15 has two stages. The first stage comprises the butterfly processors 13a and 13b. A second (=Kth) stage comprises the butterfly processors 12a, 12b, 12c and 12d. The second stage is operable to treat received signal for 4 symbols at the same time.

Figure 5:
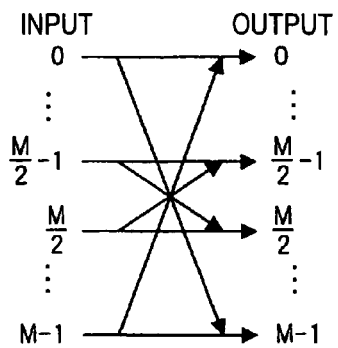
Figure 5:
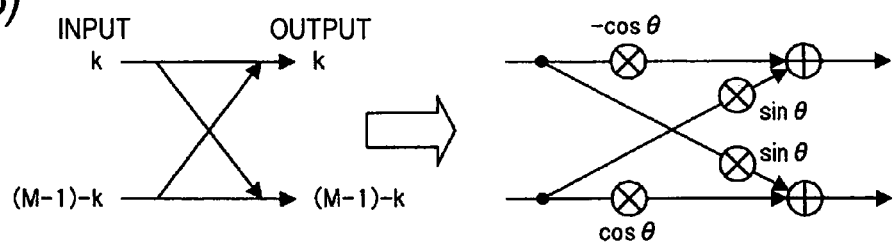
Figure 5:
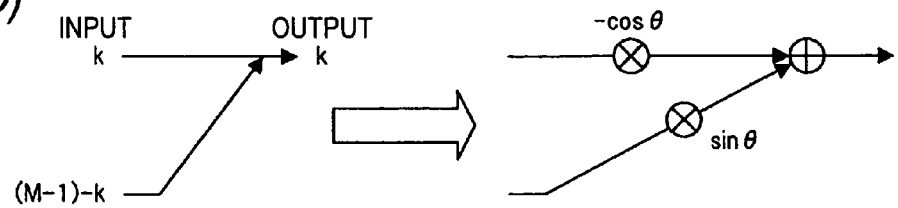
Figure 5:
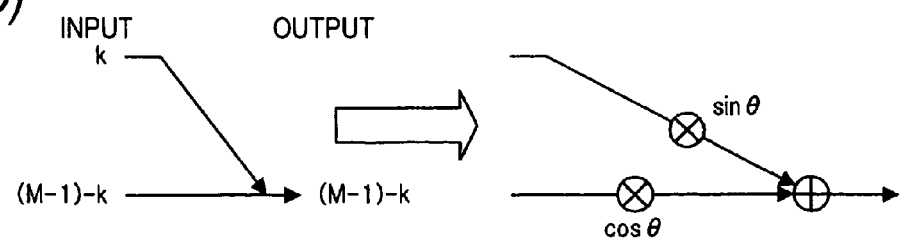

As shown in FIG. 5(a), each of the butterflies performs a butterfly operation to M inputted signals from 0 to M−1 (where M is a positive integer, usually an even number). The butterfly operation is a combination of operations shown in FIG. 5 (b). Each butterfly processor performs the operation using two inputs k and (M−1)−k, and a parameter of the butterfly operation θ, where k is equal to or more than 0 and is equal to or less than (M/2)−1. The parameter θ may be predetermined.

As shown in FIGS. 5(a), 5(b) and 5(c), the butterfly processors 12a, 12b and 13a receive M signals from 0 to M−1 and output the upper half of results of the butterfly operation, that is, M/2 signals from 0 to (M/2)−1. Similarly, the butterfly processors 12c, 12d and 13b receive M signals from 0 to M−1 and output the lower half of results of the butterfly operation shown in FIG. 5(a), that is, M/2 signals from (M/2) to M−1.

The orthogonal transformer 14 outputs received data by performing an orthogonal transform on both signals outputted from the butterfly processors 13a and 13b.

Next, a generalized example of the wavelet transformer 10 will be described with reference to FIG. 6, whereas FIGS. 4 and 5 are a specific example of the wavelet transformer 10 in the case that M is equal to 4 and K is equal to 2.

Figure 6:
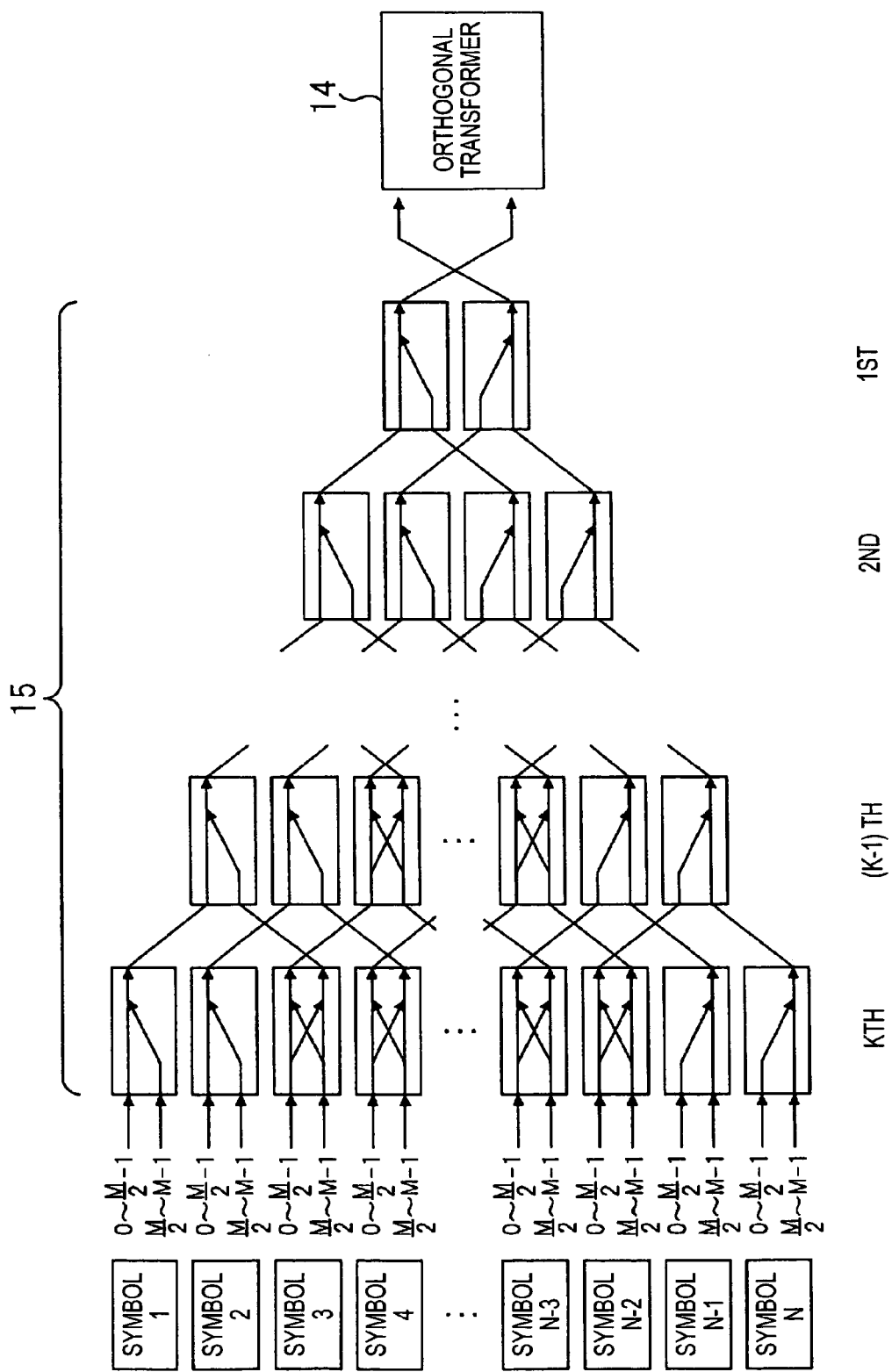
FIG. 6 is a diagram showing an example of a generalized butterfly operation unit.

As shown in FIG. 6, the butterfly operation unit 15 comprises x stages of butterfly processors, each of which has 2x butterfly processors in parallel, where x is a positive integer from 1 to K, each of which represents an order of the stage of the butterfly processors. Therefore, for example, the first stage in the butterfly operation unit 15, which is located in the far output side in FIG. 6, that is, x is equal to 1, has 2 (=2 by 1) butterfly processors. The second stage in the butterfly operation unit 15, which is located in the second far output side in FIG. 6, that is, x is equal to 2, has 4 (=2 by 2) butterfly processors. The Kth stage in the butterfly operation unit 15, which is located in the far input side in FIG. 6, that is, x is equal to K, has 2K (=2 by K) butterfly processors.

Since the Kth stage has N (=2K) butterfly processors in parallel and each butterfly processor is operable to perform the butterfly operation on the received waveform for one symbol, the Kth stage is operable to receive the received waveforms for N (=2k) symbols at one time.

If x is equal to or more than 3, in the xth stage in FIG. 6, a first butterfly processor and a second butterfly processor from the top perform the butterfly operation shown in FIG. 5(c) on inputted data from 0 to M−1. A third to (2x−2)th butterfly processors from the top perform the butterfly operation shown in FIG. 5(b) on inputted data from 0 to M−1. A (2x−1)th butterfly and a 2xth butterfly from the top perform the butterfly operation shown in FIG. 5(d) on inputted data from 0 to M−1.

In the second stage in FIG. 6, a first butterfly processor and a second butterfly processor from the top perform the butterfly operation shown in FIG. 5(c) on inputted data from 0 to M−1. A third butterfly processor and a fourth butterfly processor from the top perform the butterfly operation shown in FIG. 5(b) to inputted data from 0 to M−1. A fifth butterfly processor and a sixth butterfly processor from the top perform the butterfly operation shown in FIG. 5(d) to inputted data from 0 to M−1.

In the first stage in FIG. 6, a first butterfly processor and a second butterfly processor from the top perform the butterfly operation shown in FIG. 5(c) on inputted data from 0 to M−1. A third butterfly processor and a fourth butterfly processor from the top perform the butterfly operation shown in FIG. 5 (d) on inputted data from 0 to M−1.

Thus, the butterfly operation unit 15 treats the waveforms for N symbols at a time, and outputs the result of the butterfly operation to the orthogonal transformer 14.

Figure 14:
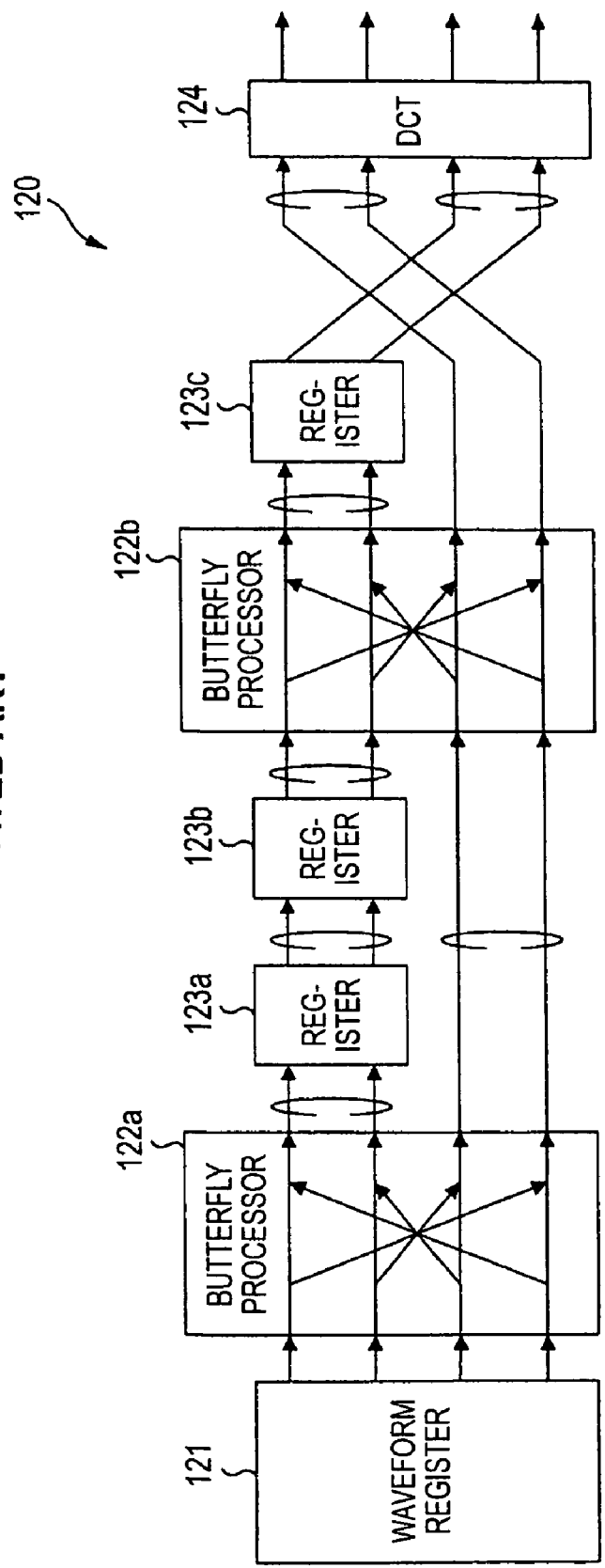
FIG. 14 is a schematic diagram showing a configuration of conventional wavelet transformer.

Next, an operation of the wavelet transformer 15 with symbol timing deviation will be described with reference to FIG. 7(a) (which represents a conventional wavelet transformer) and FIG. 7(b) (which illustrates a wavelet transformer according to one embodiment example of this invention), comparing the operation of wavelet transformer 10 according to this embodiment example with the operation of the conventional wavelet transformer 120 as shown in FIG. 14. N is 4 in FIGS. 7(a) and 7(b). The symbol timing is a timing at which the butterfly operation unit 15 obtains the received waveform from the waveform register.

Figure 7:
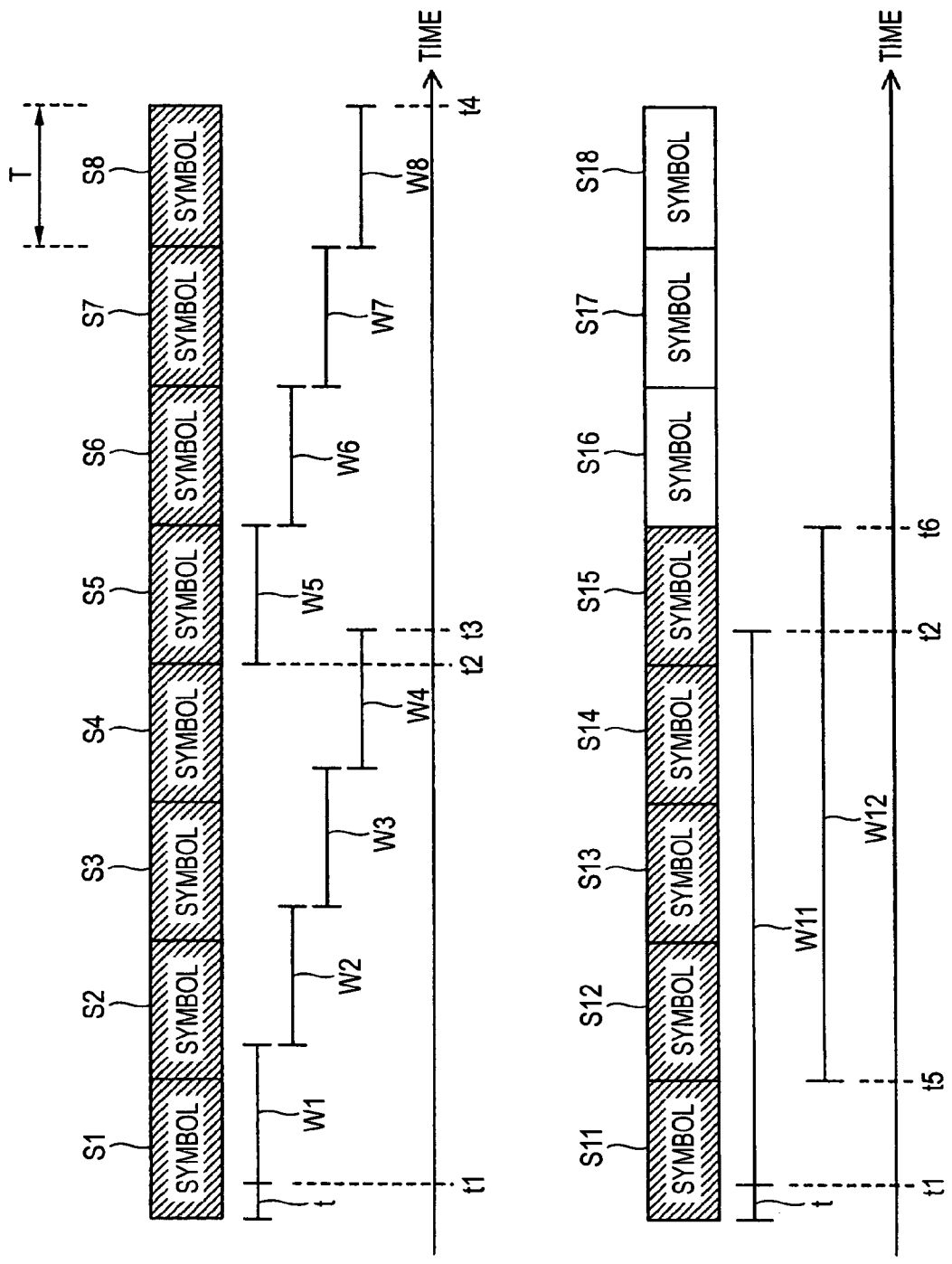
FIG. 7(a) is an explanatory diagram showing an operation of a conventional wavelet transformer in a case that timing deviation occurs in a conventional wavelet transformer.
FIG. 7(b) is an explanatory diagram showing an operation of a wavelet transformer in a case that timing deviation occurs in a wavelet transformer according to the embodiment example 1.

A time period of each of symbols S1, S2, S3, S4, S5, S6, S7 and S8 is T as shown in FIG. 7(a). As shown in FIG. 7(a), there is symbol timing deviation t, where symbol timing deviation is the deviation between the time of starting the symbol S1 and the time of starting the received waveform W1. The conventional wavelet transformer 120 gets received waveforms W1, W2, W3 and W4 from the waveform register 121, each of which is for one symbol, on one symbol-to-symbol basis, and performs a wavelet transform on each of the received waveforms W1, W2, W3 and W4. Since there is the symbol timing deviation t between the time of starting the symbol S1 and the time of starting the received waveform W1, each timing of the received waveforms W1, W2, W3 and W4 deviates from each timing of the symbols S1, S2, S3 and S4.

As noted above, N is equal to 4 in FIG. 7(a), and the wavelet transformer 120 treats a received waveform for one symbol at a time. Therefore, wavelet transformer 120 obtains the result of the butterfly operation for the received waveform for the symbol S1 after the time period 4T for four symbols after the wavelet transformer 120 started to get the received waveform W1 for S1 (if treatment time after the wavelet transformer 120 finishes getting the received waveform can be ignored). The wavelet transformer 120 is operable to obtain the received waveform at an appropriate timing by deciding right symbol timing from the result of the butterfly operation for the received waveform for S1.

However, the wavelet transformer 120 receives the received waveform on one symbol-by-symbol basis, delays the received waveform for one symbol, and performs processing. Therefore, the wavelet transformer 120 may not also use the received waveforms W2, W3 and W4 as appropriate processing result with appropriate symbol timing since all of the received waveforms W2, W3 and W4 are received at an inappropriate symbol timing with the deviation t. Therefore, the wavelet transformer 120 obtains an operation result at a time t4 when the wavelet transformer 120 finishes receiving the received waveform for the symbol S8, which is four (=N) symbols after time t2. The wavelet transformer 120 utilizes the received waveform stored in the waveform register 121 from time t2 to time t3. The time t2 is the time of the beginning of the symbol S5. The time t3 is the time of the end of the received waveform W4.

Once the symbol timing deviation occurs, a transmitter needs to send a preamble symbol to a receiver in order to synchronize the receiver and the transmitter. At the time period corresponding to eight symbols after the deviation occurs, the conventional wavelet transformer 120, as described above, obtains an operation result with an appropriate symbol timing. Therefore, the preamble symbol may be assigned for eight symbols from the symbol S1 to the symbol S8, that is, for 2N symbols, which are shown as shaded portions in FIG. 7(a).

Now, an operation of the wavelet transformer 10 according to the embodiment example of FIG. 7(b) will be described. As shown in FIG. 7(b), there is symbol timing deviation t in a symbol S11. Each of symbols S11, S12, S13, S14, S15, S16, S17 and S18 has a time period T as in the conventional example shown in FIG. 7(a). N is also 4 in this embodiment example.

The wavelet transformer 10 receives a received waveform W11 corresponding to four (=N) symbols from the waveform register 11 at one time, and performs a wavelet transform. Since the symbol timing deviates, the timing of the waveform W11 deviates from each timing of symbols S11 to S14.

At time t2, which is four symbols after starting to get the received waveform W11, the controller 50 obtains an operation result of the received waveform W11. The controller 50 decides according to the operation result how much the symbol timing deviation is, and obtains appropriate symbol timing.

Since the waveform register 11 is operable to store received waveform data for four symbols, the wavelet transformer 10 is operable to obtain, at time t6, an operation result with appropriate symbol timing by performing wavelet transform on the received waveform W12 for four symbols from the symbol S12 to the symbols S15.

In addition, the waveform register may be configured to store a received waveform corresponding to five symbols or more. In a case that the waveform register stores a received waveform corresponding to five symbols, for example, the wavelet transformer 10 is operable to get a received waveform corresponding to four symbols from the symbol S12 to the symbol S15 out of the received waveform corresponding to five symbols from the symbol S11 to the symbol S15 by changing a beginning address of the waveform register 11 in accordance with an instruction from a controller 50 shown in FIG. 8. Thus, this configuration of the waveform register, that is, storing a received waveform corresponding to N+1 symbols, makes it possible that the wavelet transformer 10 gets a received waveform corresponding to N symbols out of the received waveform corresponding to N+1 symbols by changing the address of the waveform register 11, that is, by adjusting timing to get the received waveform from the waveform register 11. Therefore, it is easier for the wavelet transformer 10 than the conventional wavelet transformer 120 to respond to symbol timing deviation in a flexible way.

Thus, the wavelet transformer 10 obtains an operation result with an appropriate symbol timing at the time period corresponding to five symbols after the deviation occurs. Therefore, the preamble symbol may be assigned five symbols from the symbol S11 to the symbol S15, that is, for N+1 symbols, which are shown as shaded portions in FIG. 7(b). In addition, the preamble symbol may be assigned six symbols or more instead of five symbols.

Comparing to the conventional example shown in FIG. 7(a), the wavelet transformer 10 is operable to reduce the number of symbols assigned as the preamble symbol by three (=N−1) symbols. Therefore, utilizing the wavelet transformer 10 makes it possible to improve transmission efficiency from a transmitter to a receiver.

Figure 8:
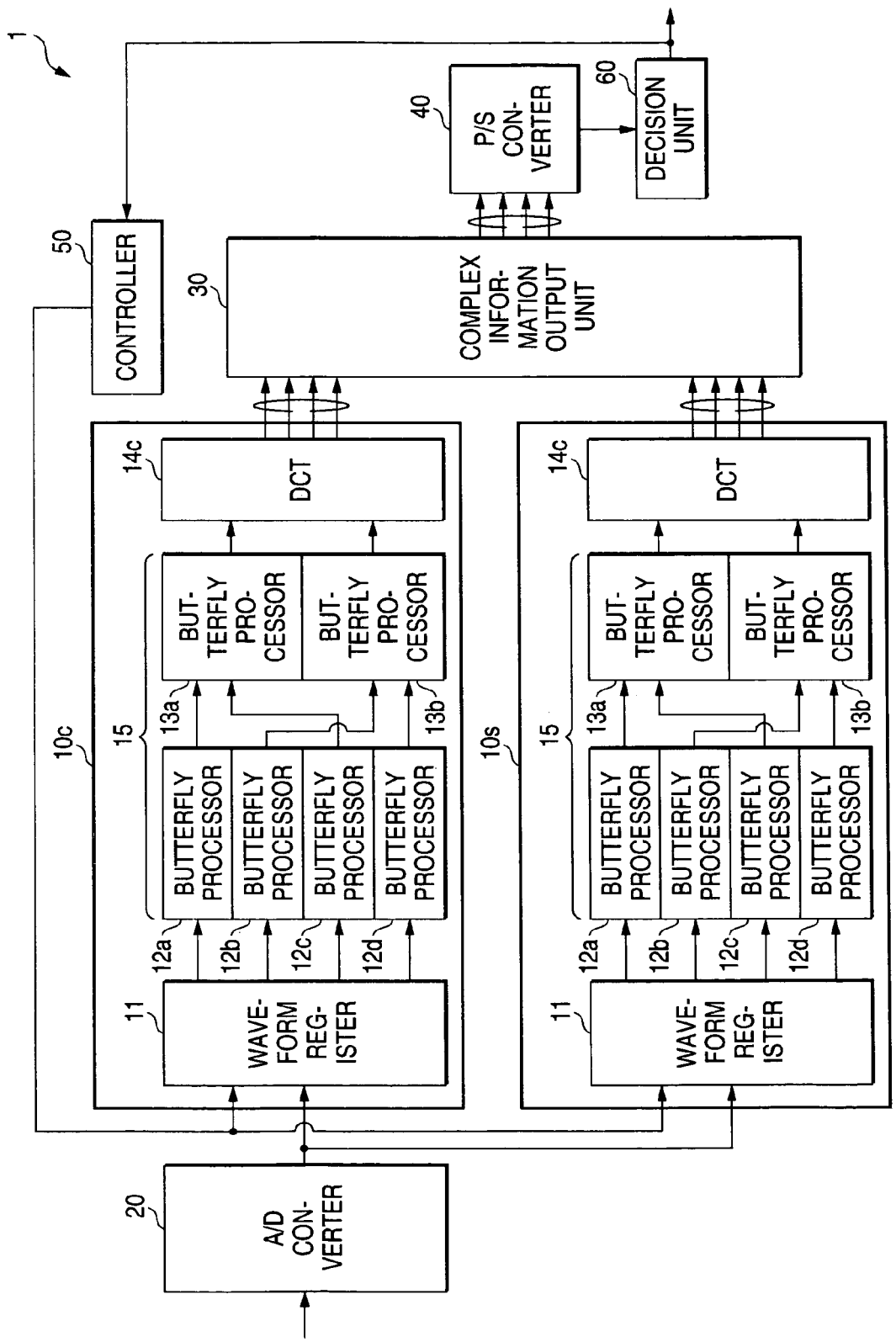
FIG. 8 is a schematic block diagram showing configuration of a receiver.
Figure 9:
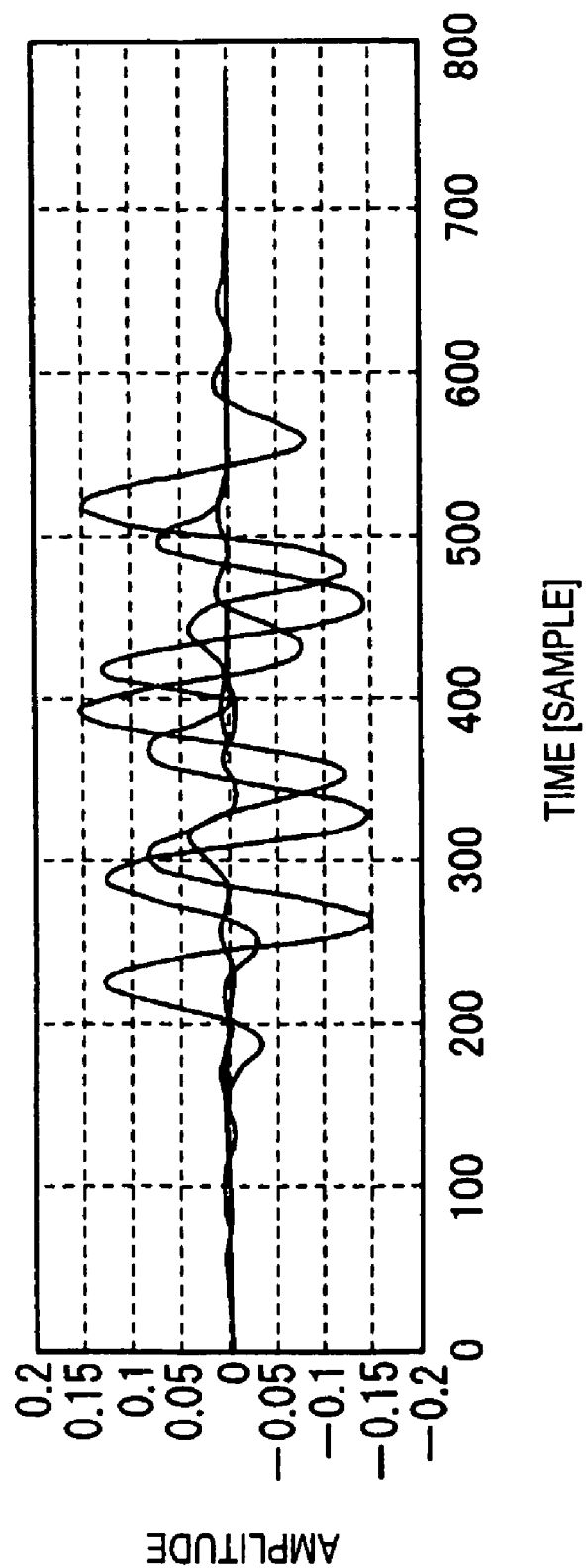
FIG. 9 is a diagram showing an example of a wavelet waveform.
Figure 10:
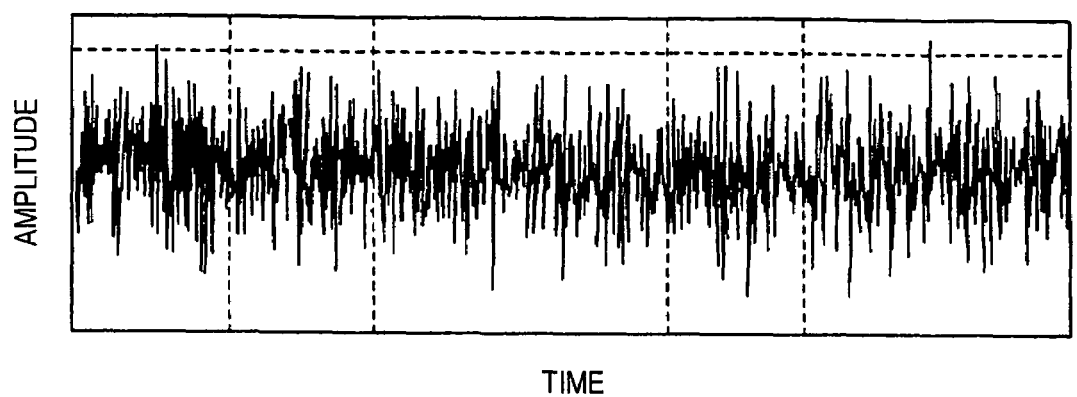
FIG. 10 is a diagram showing an example of a transmit waveform according to DWMC transmission method.
Figure 11:
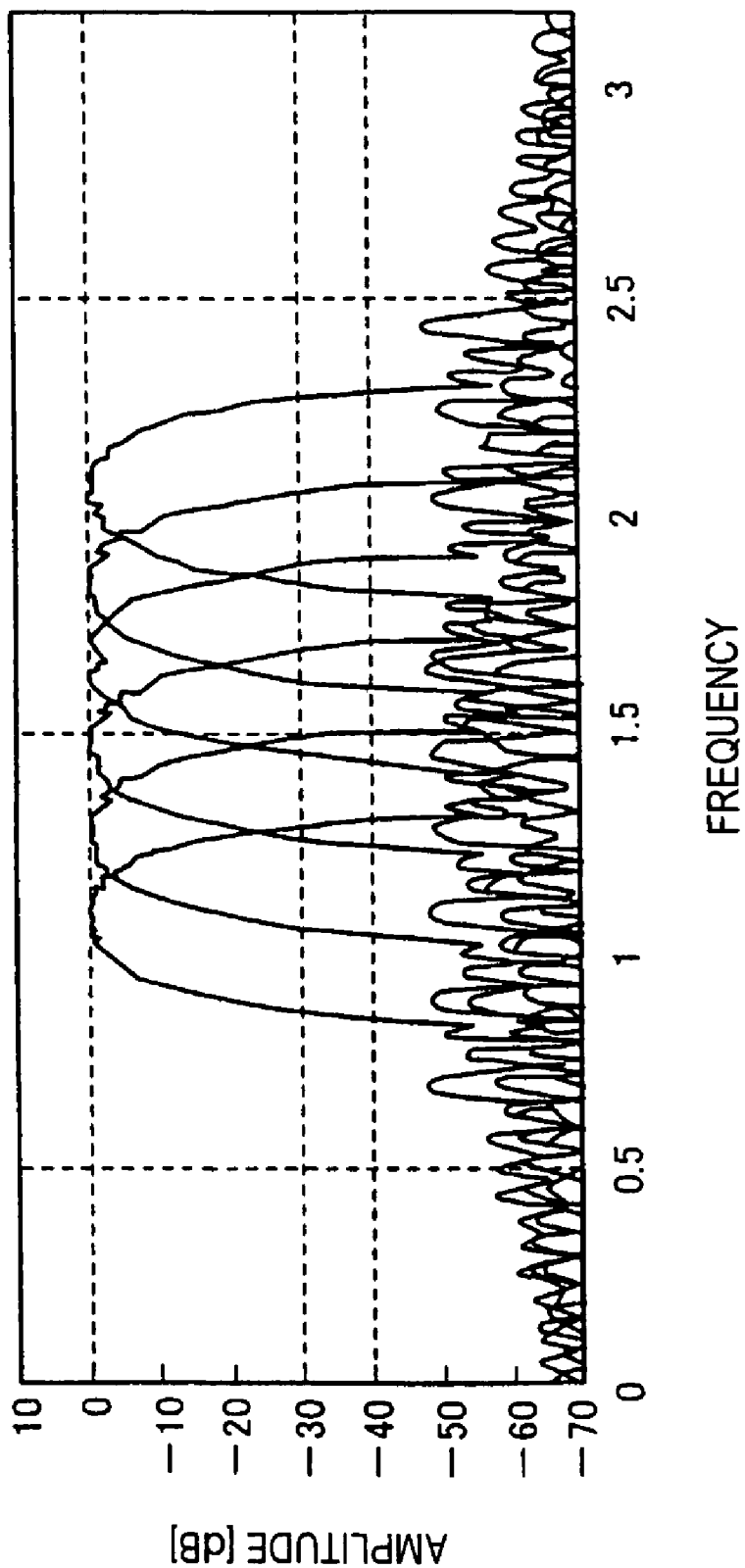
FIG. 11 is a diagram showing an example of a transmit spectrum according to DWMC transmission method.
Figure 12:
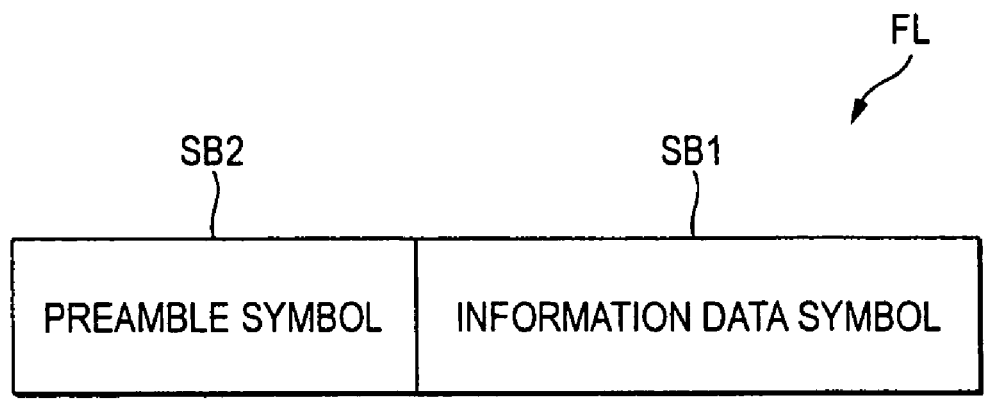
FIG. 12 is a diagram showing an example of a transmit frame according to DWMC transmission method.
Figure 13:
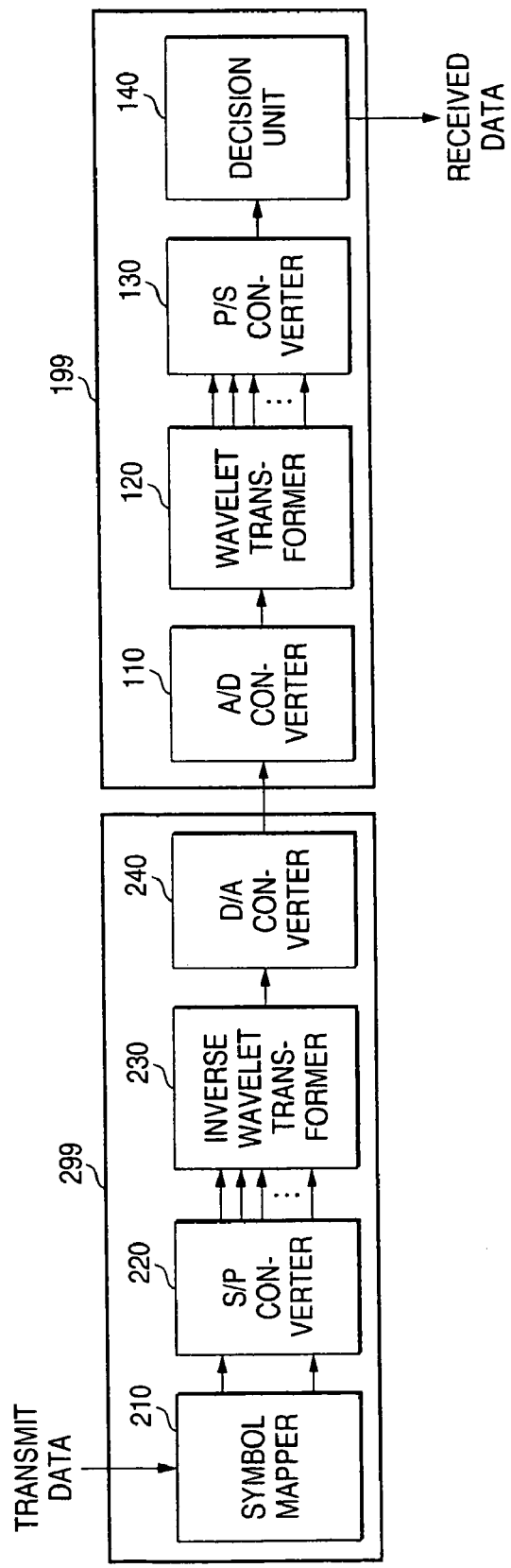
FIG. 13 is a schematic block diagram showing configuration of a communication apparatus, which comprises a transmitter and a receiver, according to DWMC transmission method.

In FIG. 8, the same reference numbers as FIG. 4 are given to overlapping structures between FIG. 4 and FIG. 8. As shown in FIG. 8, a receiver 1 according to this embodiment example comprises the A/D converter 20, a first wavelet transformer (FWT) 10c, a second wavelet transformer (SWT) 10s, an output unit of complex information 30, the P/S converter 40 and the controller 50 as shown in FIG. 8.

The A/D converter 20 converts a received analog signal to a digital signal, and outputs the digital signal to the FWT 10c and the SWT 10s.

The FWT 10c comprises a discrete cosine transformer (DCT) 14c, transforms the digital signal outputted from the A/D converter 20 to an in-phase signal, and outputs the in-phase signal to the complex information output unit 30.

The SWT 10s, which comprises a discrete sine transformer (DST) 14s, transforms the digital signal outputted from the AID converter 20 to a quadrature signal, which is orthogonal to the in-phase signal, and outputs the quadrature signal to the complex information output unit 30.

The complex information output unit 30 receives the in-phase signal outputted from the FWT 10c and the quadrature signal outputted from the SWT 10s, obtains complex information from both the in-phase signal and the quadrature signal, and outputs the complex information to the P/S converter 40. The P/S converter 40 converts parallel data of the complex information outputted from the complex information output unit 30 to serial data. The controller 50 decides the symbol timing from the serial data outputted from the P/S converter 40, controls an address of the waveform register 11, which is used when the wavelet transformers 10c and 10s acquire waveform data from the waveform register 11.

This configuration makes it possible for the receiver 1 to utilize complex information because the receiver 1 is operable to utilize not only in-phase component data obtained by the FWT 10c but also quadrature component data obtained by the SWT 10s. If the receiver 1 does not utilize the complex information, the data obtained by the SWT 10s are used for many other purposes. For example, if a change in a phase of the received waveform caused by a change in condition of a transmission line occurs, the receiver 1 is operable to adjust the change in the phase by utilizing the data from the SWT 10s. Therefore, the receiver 1 is operable to improve an accuracy of received data demodulation.

In addition, at least one of the FWT 10c and the SWT 10s comprises the waveform register that is operable to store waveform corresponding to 2K (=N) symbols or more. Therefore, the receiver 1 is operable to detect a symbol timing deviation, and adjust to the symbol timing deviation, promptly. Furthermore, utilizing the receiver 1 makes it possible to reduce the number of the preamble symbol used in a communication. Thus, the transmission efficiency may be improved.

Although various embodiment examples of the present invention have been described and disclosed for illustrative purposes, those skilled in the art will appreciate that various modifications, additions, and substitutions are possible, without departing from the scope and spirit of the invention as set forth in the accompanying claims.

CROSS REFERENCE TO RELATED APPLICATION

This application is based upon and claims the benefit of priority of Japanese Patent Application No. 2004-364413 filed on Dec. 16, 2004, the contents of which is incorporated herein by reference in its entirety.

What is claimed is:

1. A receiving apparatus employing a digital multi-carrier transmission method utilizing a real coefficient wavelet filter bank in digital demodulation, said apparatus comprising:
 a memory configured to store received waveform data,
 a butterfly operation unit including K stages of butterfly processors, each of the butterfly processors being operable to perform butterfly operation using received waveform data corresponding to one symbol obtained from the memory; and
 an orthogonal transformer configured to perform an orthogonal transform based on received waveform data corresponding to 2K symbols using results of the butterfly operation performed by the K stages of butterfly processors,
 wherein the memory stores the received waveform data corresponding to 2K or more symbols which are continuous on time axis,
 wherein a Kth stage of the butterfly operation unit directly receives the received waveform data from the memory and has 2K butterfly processors, and each of the 2K butterfly processors receives, at a same time from the memory, the received waveform data corresponding to the 2K symbols, and
 wherein each stage of the K stages of butterfly processors includes at least two of the butterfly processors which provide an output which is half the number of the waveform data input thereto, by adding the received waveform data input thereto with each other.

2. The receiving apparatus according to claim 1, wherein: the butterfly processors perform the butterfly operation in parallel.

3. The receiving apparatus according to claim 1, wherein the orthogonal transformer comprises one of a discrete cosine transformer and a discrete sine transformer.

4. The receiving apparatus according to claim 1, further comprising:
 at least one other memory configured to store received waveform data;
 at least one other butterfly operation unit including K stages of butterfly processors, each of the butterfly processors being operable to perform a butterfly operation using received waveform data corresponding to one symbol obtained from the memory; and
 at least one other orthogonal transformer configured to perform an orthogonal transform based on received waveform data corresponding to 2K symbols using results of the butterfly operation performed by the other butterfly operation unit,
 wherein the other memory stores the received waveform data corresponding to 2K or more symbols which are continuous on time axis, and
 wherein a Kth stage of the other butterfly operation unit directly receives the received waveform data from the other memory and has 2K butterfly processors, and each of the 2K butterfly processors receives, at a same time from the other memory, the received waveform data corresponding to the 2K symbols.

5. The receiving apparatus according to claim 1, wherein the orthogonal transformer comprises a discrete cosine transformer, and the at least one other orthogonal transformer comprises a discrete sine transformer.

6. A receiving method employing a digital multi-carrier transmission method utilizing a real coefficient wavelet filter bank in digital demodulation, said receiving method comprising:
 (a) storing in a memory received waveform data;
 (b) performing a butterfly operation by each of butterfly processors in K stages of butterfly processors using received waveform data corresponding to one symbol obtained from the memory; and
 (c) performing an orthogonal transform based on received waveform data corresponding to 2K symbols using results of the butterfly operation performed by the K stages of butterfly processors,
 wherein in step(a) the memory stores received waveform data corresponding to 2K or more symbols which are continuous on the time axis,
 wherein in step(b), a Kth stage of the butterfly processors directly receives the received waveform data from the memory and has 2K butterfly processors, and each of the 2K butterfly processors receives, at a same time from the memory, the received waveform data corresponding to the 2K symbols, and
 wherein each stage of the K stages of butterfly processors includes at least two of the butterfly processors, and in step(b), said at least two of the butterfly processors provide an output which is half the number of the waveform data input thereto, by adding the received waveform data input thereto with each other.

7. An integrated circuit for receiving apparatus employing a digital multi-carrier transmission method utilizing a real coefficient wavelet filter bank in digital demodulation, said integrated circuit comprising:
 a memory block configured to store received waveform data;

a butterfly operation block including K stages of butterfly processors, each of the butterfly processors being operable to perform a butterfly operation using received waveform data corresponding to one symbol obtained from the memory block; and an orthogonal transforming block configured to perform an orthogonal transform based on received waveform data corresponding to 2K symbols using results of the butterfly operation performed by the K stages of butterfly processors, wherein the memory block stores the received waveform data corresponding to 2K or more symbols which are continuous on a time axis, wherein a Kth stage of the butterfly operation block directly receives the received waveform data from the memory block and has 2K butterfly processors, and each of the 2K butterfly processors receives, at a same time from the memory block, the received waveform data corresponding to the 2K symbols, and wherein each stage of the K stages of butterfly processors includes at least two of the butterfly processors which provide an output which is half the number of the waveform data input thereto, by adding the received waveform data input thereto with each other.

8. A transceiver comprises the receiving apparatus according to claim 1.

9. A modem comprises the receiving apparatus according to claim 1.

* * * * *